(12) United States Patent
Bertrand et al.

(10) Patent No.: US 11,516,840 B2
(45) Date of Patent: *Nov. 29, 2022

(54) SIGNALING OF RANDOM ACCESS PREAMBLE PARAMETERS IN WIRELESS NETWORKS

(71) Applicant: Texas Instruments Incorporated, Dallas, TX (US)

(72) Inventors: Pierre Bertrand, Antibes (FR); Jing Jiang, Wellesley, MA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/074,077

(22) Filed: Oct. 19, 2020

(65) Prior Publication Data

US 2021/0037566 A1 Feb. 4, 2021

Related U.S. Application Data

(63) Continuation of application No. 16/247,072, filed on Jan. 14, 2019, now Pat. No. 10,813,127, which is a
(Continued)

(51) Int. Cl.
*H04W 74/00* (2009.01)
*H04W 74/04* (2009.01)
(Continued)

(52) U.S. Cl.
CPC ......... *H04W 74/004* (2013.01); *H04L 1/1812* (2013.01); *H04L 5/00* (2013.01);
(Continued)

(58) Field of Classification Search
CPC ... H04W 74/004; H04W 24/02; H04W 74/04; H04W 84/12; H04W 88/02; H04W 88/08;
(Continued)

(56) References Cited

U.S. PATENT DOCUMENTS

| 7,599,327 B2 * | 10/2009 | Zhuang ............... H04L 25/0212 370/329 |
| 9,357,564 B2 | 5/2016 | Bertrand et al. |

(Continued)

OTHER PUBLICATIONS

"Non Synchronized Random Access Procedure in E-UTRA", 3GPP TSG RAN WG1 #47, R1-063212, Agenda Item: 6.3.1., Texas Instruments Incorporated, Riga, Latvia, Nov. 6-10, 2006, 5 pages.
(Continued)

*Primary Examiner* — Afshawn M Towfighi
(74) *Attorney, Agent, or Firm* — Gregory J. Albin; Charles A. Brill; Frank D. Cimino

(57) ABSTRACT

User equipment (UE)-initiated accesses within a cellular network are optimized to account for cell size and to reduce signaling overhead. A fixed set of preamble parameter configurations for use across a complete range of cell sizes within the cellular network is established and stored within each UE. A UE located in a given cell receives a configuration number transmitted from a nodeB serving the cell, the configuration number being indicative of a size of the cell. The UE selects a preamble parameter configuration from the fixed set of preamble parameter configurations in response to the received configuration number and then transmits a preamble from the UE to the nodeB using the preamble parameter configuration indicated by the configuration number.

18 Claims, 6 Drawing Sheets

Related U.S. Application Data continuation of application No. 15/804,967, filed on Nov. 6, 2017, now Pat. No. 10,182,454, which is a continuation of application No. 15/167,515, filed on May 27, 2016, now Pat. No. 9,814,066, which is a continuation of application No. 11/970,239, filed on Jan. 7, 2008, now Pat. No. 9,357,564.

(60) Provisional application No. 61/017,542, filed on Dec. 29, 2007, provisional application No. 60/944,913, filed on Jun. 19, 2007.

(51) Int. Cl.
*H04L 1/18* (2006.01)
*H04L 5/00* (2006.01)
*H04W 24/02* (2009.01)
*H04W 74/08* (2009.01)
*H04W 84/12* (2009.01)
*H04W 88/02* (2009.01)
*H04W 88/08* (2009.01)

(52) U.S. Cl.
CPC .......... *H04L 5/0032* (2013.01); *H04L 5/0051* (2013.01); *H04L 5/0055* (2013.01); *H04W 24/02* (2013.01); *H04W 74/04* (2013.01); *H04W 74/0833* (2013.01); *H04W 84/12* (2013.01); *H04W 88/02* (2013.01); *H04W 88/08* (2013.01)

(58) Field of Classification Search
CPC .... H04W 74/0833; H04L 1/1812; H04L 5/00; H04L 5/0032; H04L 5/0051; H04L 5/0055
See application file for complete search history.

(56) References Cited

U.S. PATENT DOCUMENTS 9,814,066 B2  11/2017  Bertrand et al.
10,182,454 B2  1/2019  Bertrand et al.
2008/0096563 A1* 4/2008  Fischer ................ H04L 1/0028
                                                        455/436
2009/0073944 A1* 3/2009  Jiang .................... H04J 11/00
                                                        370/338
2009/0086832 A1* 4/2009  Tarokh ............... H04L 27/2613
                                                        375/260
2010/0284350 A1  11/2010  Korhonen et al.

OTHER PUBLICATIONS

"RACH Sequence Indication Method on BCH," 3GPP TSG RAN WG1 Meeting #48bis, R1-071519, Agenda Item: 7.4, Panasonic, St. Julians, Malta, Mar. 26-30, 2007, 3 pages.

"Random Access Preamble L1 Parameters in E-UTRA", 3GPP TSG RAN WG1 #49bis, R1-072838, Agenda Item: 5.4, Texas Instruments Incorporated, Orlando, FL, Jun. 25-29, 2007, 5 pages.

"Random Access Preamble L1 Parameters in E-UTRA", 3GPP TSG RAN WG1 #50, R1-073435, Agenda Item: 7.2.9, Texas Instruments Incorporated, Athens, Greece, Aug. 20-24, 2007, 7 pages.

"Cyclic Shift Values for E-UTRA PRACH", 3GPP TSG RAN WG1 #50bis, R1-074147, Agenda Item: 6.2.7., Texas Instruments Incorporated, Shanghai, China, Oct. 8-12, 2007, 6 pages.

"3rd Generation Partnership Project; Technical Specification Group Radio Access Network; Physical Channels and Modulation (Release 8)," 3GPP TS 36.211, V1.0.0, Mar. 2007, 30 pages.

Prosecution History, U.S. Appl. No. 11/970,239, filed Jan. 7, 2008, 321 pages.

Prosecution History, U.S. Appl. No. 15/167,515, filed May 27, 2016, 353 pages.

Prosecution History, U.S. Appl. No. 15/840,967, filed Nov. 6, 2017, 205 pages.

Prosecution History, U.S. Appl. No. 16/247,072, filed Jan. 14, 2019, 351 pages.

"RACH Sequence Allocation and Inidication to the Cell," 3GPP TSG RAN WG1 Meeting #49, R1-072079, Kobe, Japan, May 7-11, 2007, uploaded to 3GPP file server on May 2, 2007, 7 pages.

"Preamble Allocation for Non-Synchronized Rach," 3GPP TSG RAN WG1 Meeting #49, R1-072330, Kobe, Japan, May 7-11, 2007, uploaded to 3GPP file server on May 2, 2007, 3 pages.

* cited by examiner

SIGNALING OF RANDOM ACCESS PREAMBLE PARAMETERS IN WIRELESS NETWORKS

CROSS-REFERENCE TO RELATED APPLICATIONS

This application is a continuation of U.S. patent application Ser. No. 16/247,072, filed Jan. 14, 2019, which is a continuation of U.S. patent application Ser. No. 15/804,967, filed Nov. 6, 2017, which is a continuation of U.S. patent application Ser. No. 15/167,515, filed May 27, 2016, (now U.S. Pat. No. 9,814,066) which is a continuation of U.S. patent application Ser. No. 11/970,239 filed Jan. 7, 2008, (now U.S. Pat. No. 9,357,564) which claims the benefit of U.S. Provisional Application No. 61/017,542 filed on Dec. 29, 2007, entitled "Signaling of Random Access Preamble Parameters in Wireless Network," and U.S. Provisional Application No. 60/944,913 filed on Jun. 19, 2007 entitled "Optimization of Random Access Preamble Parameters Signaling in Wireless Networks" the entire content of all of which are incorporated herein by reference in their entirety.

FIELD OF THE INVENTION

This invention generally relates to wireless cellular communication, and in particular to a non-synchronous request channel for use in orthogonal and single carrier frequency division multiple access (OFDMA) (SC-FDMA) systems.

BACKGROUND OF THE INVENTION

The Global System for Mobile Communications (GSM: originally from Groupe Spécial Mobile) is currently the most popular standard for mobile phones in the world and is referred to as a 2G (second generation) system. Universal Mobile Telecommunications System (UMTS) is one of the third-generation (3G) mobile phone technologies. Currently, the most common form uses W-CDMA (Wideband Code Division Multiple Access) as the underlying air interface. W-CDMA is the higher speed transmission protocol designed as a replacement for the aging 2G GSM networks deployed worldwide. More technically, W-CDMA is a wideband spread-spectrum mobile air interface that utilizes the direct sequence Code Division Multiple Access signaling method (or CDMA) to achieve higher speeds and support more users compared to the older TDMA (Time Division Multiple Access) signaling method of GSM networks.

Orthogonal Frequency Division Multiple Access (OFDMA) is a multi-user version of the popular Orthogonal Frequency-Division Multiplexing (OFDM) digital modulation scheme. Multiple access is achieved in OFDMA by assigning subsets of sub-carriers to individual users. This allows simultaneous low data rate transmission from several users. Based on feedback information about the channel conditions, adaptive user-to-sub-carrier assignment can be achieved. If the assignment is done sufficiently fast, this further improves the OFDM robustness to fast fading and narrow-band co-channel interference, and makes it possible to achieve even better system spectral efficiency. Different number of sub-carriers can be assigned to different users, in view to support differentiated Quality of Service (QoS), i.e. to control the data rate and error probability individually for each user. OFDMA is used in the mobility mode of IEEE 802.16 WirelessMAN Air Interface standard, commonly referred to as WiMAX. OFDMA is currently a working assumption in 3GPP Long Term Evolution (LTE) downlink. Also, OFDMA is the candidate access method for the IEEE 802.22 "Wireless Regional Area Networks".

NodeB is a term used in UMTS to denote the BTS (base transceiver station). In contrast with GSM base stations, NodeB uses WCDMA or OFDMA as air transport technology, depending on the type of network. As in all cellular systems, such as UMTS and GSM, NodeB contains radio frequency transmitter(s) and the receiver(s) used to communicate directly with the mobiles, which move freely around it. In this type of cellular networks the mobiles cannot communicate directly with each other but have to communicate with the BTSs.

Traditionally, the NodeBs have minimum functionality, and are controlled by an RNC (Radio Network Controller). However, this is changing with the emergence of High Speed Downlink Packet Access (HSDPA), where some logic (e.g. retransmission) is handled on the NodeB for lower response times and in 3GPP long term evolution (LTE) wireless networks (a.k.a. E-UTRA—Evolved Universal Terrestrial Radio Access Network) almost all the RNC functionalities have moved to the NodeB. A NodeB is generally a fixed station and may be called a base transceiver system (BTS), an access point, a base station, or various other names. As the network has evolved, a NodeB is also referred to as an "evolved NodeB" (eNB).

In WCDMA and OFDMA the cell's size is not constant (a phenomenon known as "cell breathing"). This requires a careful planning in 3G (UMTS) networks. Power requirements on NodeBs and UE (user equipment) are typically lower than in GSM.

A NodeB can serve several cells, also called sectors, depending on the configuration and type of antenna. Common configuration include omni cell (360°), 3 sectors) (3×120°) or 6 sectors (3 sectors 120° wide overlapping with 3 sectors of different frequency).

High-Speed Packet Access (HSPA) is a collection of mobile telephony protocols that extend and improve the performance of existing UMTS protocols. Two standards HSDPA and HSUPA have been established. High Speed Uplink Packet Access (HSUPA) is a packet-based data service of Universal Mobile Telecommunication Services (UMTS) with typical data transmission capacity of a few megabits per second, thus enabling the use of symmetric high-speed data services, such as video conferencing, between user equipment and a network infrastructure.

An uplink data transfer mechanism in the HSUPA is provided by physical HSUPA channels, such as an Enhanced Dedicated Physical Data Channel (E-DPDCH), implemented on top of the uplink physical data channels such as a Dedicated Physical Control Channel (DPCCH) and a Dedicated Physical Data Channel (DPDCH), thus sharing radio resources, such as power resources, with the uplink physical data channels. The sharing of the radio resources results in inflexibility in radio resource allocation to the physical HSUPA channels and the physical data channels.

The signals from different users within the same cell may interfere with one another. This type of interference is known as the intra-cell interference. In addition, the base station also receives the interference from the users transmitting in neighboring cells. This is known as the inter-cell interference When an orthogonal multiple access scheme such as Single-Carrier Frequency Division Multiple Access (SC-FDMA)—which includes interleaved and localized Frequency Division Multiple Access (FDMA) or Orthogonal Frequency Division Multiple Access (OFDMA)—is used; intra-cell multi-user interference is not present. This is the case for the next generation of the 3$^{rd}$ generation partnership project (3GPP) enhanced-UTRA (E-UTRA) system—which employs SC-FDMA—as well as IEEE 802.16e also known as Worldwide Interoperability for Microwave Access (WiMAX)—which employs OFDMA, In this case, the fluctuation in the total interference only comes from inter-cell interference and thermal noise which tends to be slower. While fast power control can be utilized, it can be argued that its advantage is minimal.

In the uplink (UL) of OFDMA frequency division multiple access (both classic OFDMA and SC-FDMA) communication systems, it is beneficial to provide orthogonal reference signals (RS), also known as pilot signals, to enable accurate channel estimation and channel quality indicator (CQI) estimation enabling UL channel dependent scheduling, and to enable possible additional features which require channel sounding.

Channel dependent scheduling is widely known to improve throughput and spectral efficiency in a network by having the NodeB, also referred to as base station, assign an appropriate modulation and coding scheme for communications from and to a user equipment (UE), also referred to as mobile, depending on channel conditions such as the received signal-to-interference and noise ratio (SINR). In addition to channel dependent time domain scheduling, channel dependent frequency domain scheduling has been shown to provide substantial gains over purely distributed or randomly localized (frequency hopped) scheduling in OFDMA-based systems. To enable channel dependent scheduling, a corresponding CQI measurement should be provided over the bandwidth of interest. This CQI measurement may also be used for link adaptation, interference co-ordination, handover, etc.

Several control signaling information bits on downlink transmission need to be transmitted in uplink, as described in 3GPP TR 25.814 v7.0.0. 3rd Generation Partnership Project; Technical Specification Group Radio Access Network; Physical layer aspects for evolved Universal Terrestrial Radio Access (UTRA). For example, downlink hybrid Automatic Repeat reQuest (ARQ) (HARQ) requires a 1-bit ACK/NACK in uplink for each received downlink transport block. Further, the downlink channel quality indicator (CQI) needs to be feedback in the uplink to support frequency selective scheduling in the downlink. When a UE (user equipment) has uplink data transmission, the downlink ACK/NACK and/or CQI can be transmitted along with the uplink data, in which the uplink reference signal can be used for coherent demodulation of the uplink data, as well as the downlink ACK/NACK and/or CQI. In case there is no uplink data transmission, a reference signal can be transmitted for coherent demodulation of the downlink ACK/NACK and/or CQI. Thus, multiple dedicated time-frequency resource blocks are necessary for the reference signal and the ACK/NACK and/or CQI. While CQI may be transmitted less frequently based on a periodic or triggered mechanism, ACK/NACK needs to be transmitted in a timely manner for every received downlink transport block to support HARQ. Note that ACK/NACK is sometimes denoted as ACKNAK or just simply ACK, or any other equivalent term.

User equipments (UE) of an E-UTRAN network are time and frequency multiplexed on a shared channel (SCH) such that time (approximately 1 μs) and frequency synchronization are required. The scheduler, in the base-station, has full control of the time and frequency locations of uplink transmissions for all connected user devices, except for UE autonomous transmissions through either the (non-synchronized) random access channel (RACH) channel or the scheduling request (SR) channel. To enable proper scheduling and multi-UE management, each UE should be uniquely identified to a base-station. The 3GPP working groups have proposed a 16-bit identifier (ID) for UE's, which represents significant overhead costs for uplink and downlink control signaling in an E-UTRAN network because, in practical implementations, at most a few hundred UE's (compared to $2^{16}$) will be maintained in uplink synchronization. An uplink synchronized UE can request and have access to uplink transmissions faster than a non-synchronized UE, which first needs to recover synchronization.

In E-UTRA, the non-synchronized physical random access channel (PRACH) is a contention-based channel multiplexed with scheduled data in a TDM/FDM manner. It is accessible during PRACH slots of duration $T_{RA}$ and period $T_{RA}$.

SUMMARY OF THE INVENTION

An embodiment of the present invention provides a method for transmitting in a cellular network. User equipment (UE)-initiated accesses within a cellular network are optimized to account for cell size and to reduce signaling overhead. A fixed set of preamble parameter configurations for use across a complete range of cell sizes within the cellular network is established and stored within each UE. A UE located in a given cell receives a configuration number transmitted from a nodeB serving the cell, the configuration number being indicative of a size of the cell. The UE selects a preamble parameter configuration from the fixed set of preamble parameter configurations in response to the received configuration number and then transmits a preamble from the UE to the nodeB using the preamble parameter configuration indicated by the configuration number.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Disclosed herein are various systems and methods for employing a random access channel in a wireless network to accommodate user equipment operating in cells of varying sizes. Embodiments of the disclosed invention may be used to access a wireless network, such as a telecommunications system, employing random access techniques. A variety of wireless networks employ random access techniques, for example the Enhanced Universal Terrestrial Radio Access Network (E-UTRAN), currently being standardized by the 3GPP working groups. The disclosed embodiments of the invention are applicable to all such networks. The disclosed embodiments include apparatus for transmitting random access signals and a method for transmitting a random access signal optimized for cellular coverage.

Embodiments of the present disclosure are directed, in general, to wireless communication systems, and can be applied to generate random access transmissions. Random access transmissions may also be referred to as ranging transmissions, or other analogous terms.

User Equipment ("UE") may be either up-link ("UL") synchronized or UL non-synchronized. That is, UE transmit timing may or may not be adjusted to align UE transmissions with NodeB transmission time slots. When the UE UL has not been time synchronized, or has lost time synchronization, the UE can perform a non-synchronized random access to request allocation of up-link resources. Additionally, a UE can perform non-synchronized random access to register itself at the access point, or for numerous other reasons. Possible uses of random access transmission are many, and do not restrict the scope of the present disclosure. For example, the non-synchronized random access allows the NodeB to estimate, and if necessary, to adjust the UE's transmission timing, as well as to allocate resources for the UE's subsequent up-link transmission. Resource requests from UL non-synchronized UEs may occur for a variety of reasons, for example: new network access, data ready to transmit, or handover procedures.

Figure 1:
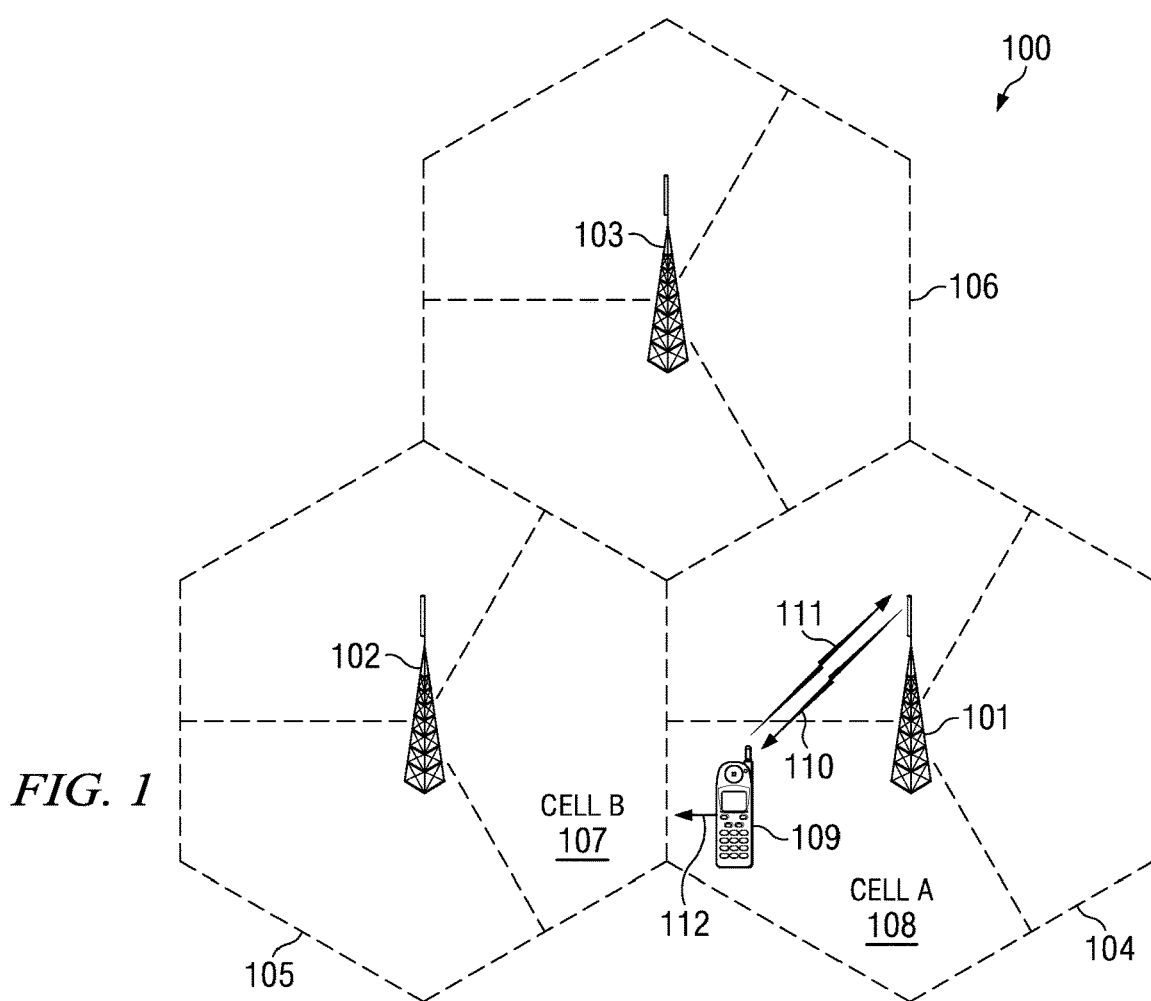
FIG. 1 is a pictorial of an illustrative telecommunications network that supports transmission of multiplexed RA preambles.

FIG. 1 shows an illustrative wireless telecommunications network 100. The illustrative telecommunications network 100 includes base stations 101, 102, and 103, though in operation, a telecommunications network may include more base stations or fewer base stations. Each of base stations 101, 102, and 103 is operable over corresponding coverage areas 104, 105, and 106. Each base station's coverage area is further divided into cells. In the illustrated network, each base station's coverage area is divided into three cells. Handset or other UE 109 is shown in Cell A 108, which is within coverage area 104 of base station 101. Base station 101 is transmitting to and receiving transmissions from UE 109. As UE 109 moves out of Cell A 108, and into Cell B 107, UE 109 may be "handed over" to base station 102. Assuming that UE 109 is synchronized with base station 101, UE 109 likely employs non-synchronized random access to initiate handover to base station 102. The distance over which a random access signal is recognizable by base station 101 is a factor in determining cell size.

When UE 109 is not up-link synchronized with base station 101, non-synchronized UE 109 employs non-synchronous random access (NSRA) to request allocation of up-link 111 time or frequency or code resources. If UE 109 has data ready for transmission, for example, traffic data, measurements report, tracking area update, etc., UE 109 can transmit a random access signal on up-link 111 to base station 101. The random access signal notifies base station 101 that UE 109 requires up-link resources to transmit the UE's data. Base station 101 responds by transmitting to UE 109, via down-link 110, a message containing the parameters of the resources allocated for UE 109 up-link transmission along with a possible timing error correction. After receiving the resource allocation and a possible timing adjustment message transmitted on down-link 110 by base station 101, UE 109 may adjust its transmit timing, to bring the UE 109 into synchronization with base station 101, and transmit the data on up-link 111 employing the allotted resources during the prescribed time interval.

Figure 2:
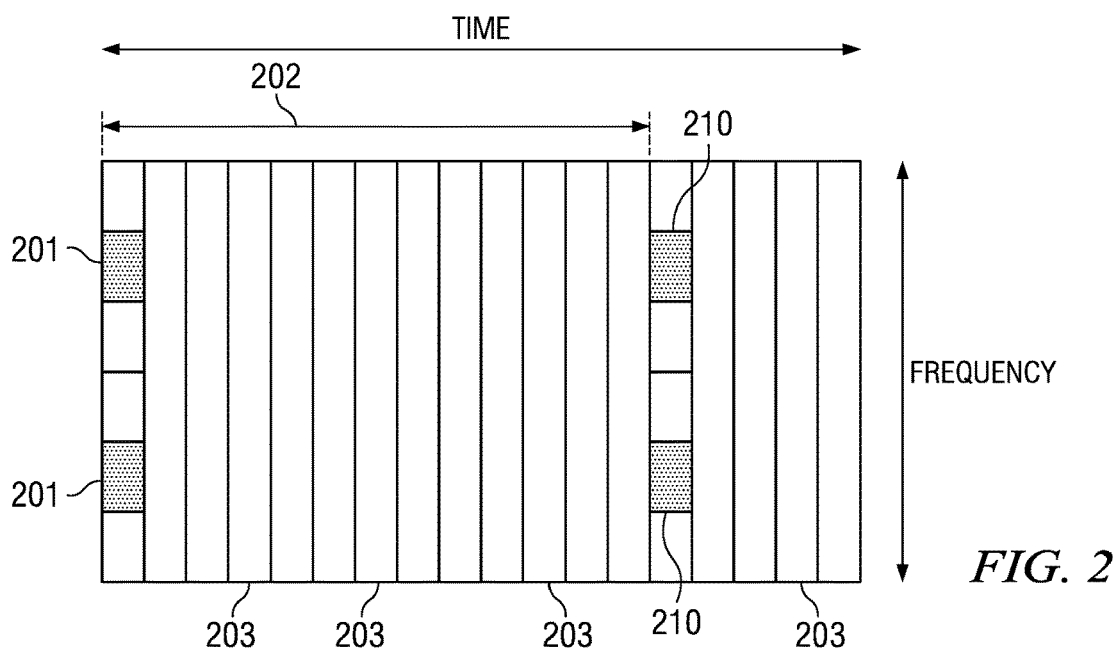
FIG. 2 is an illustrative up-link time/frequency allocation for use in the network of FIG. 1.

FIG. 2 illustrates an exemplary up-link transmission frame 202, and the allocation of the frame to scheduled and random access channels. The illustrative up-link transmission frame 202, comprises a plurality of transmission sub-frames. Sub-frames 203 are reserved for scheduled UE up-link transmissions. Interspersed among scheduled sub-frames 203, are time and frequency resources allocated to random access channels 201, 210. In the illustration of FIG. 2, a single sub-frame supports two random access channels. Note that the illustrated number and spacing of random access channels is purely a matter of convenience; a particular transmission frame implementation may allocate more or less resource to random access channels. Including multiple random access channels allows more UEs to simultaneously transmit a random access signal without collision. However, because each UE independently chooses the random access channel on which it transmits, collisions between UE random access signals may occur.

Figure 3:
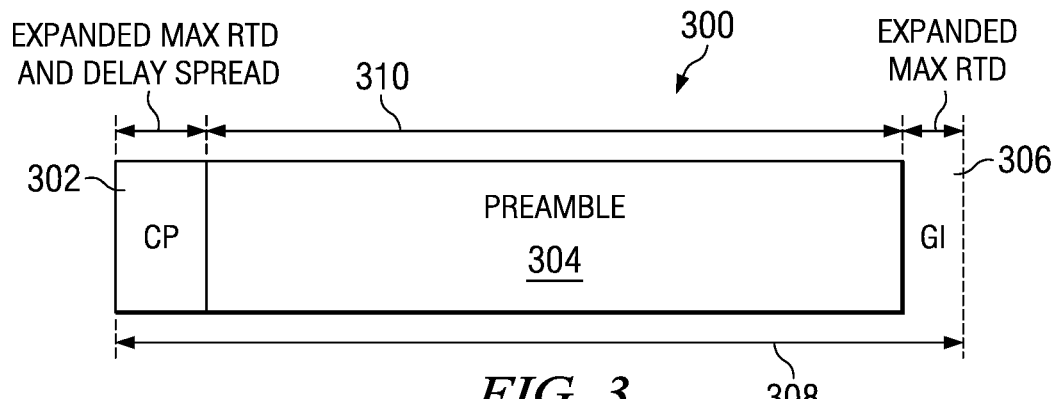
FIG. 3 illustrates a non-synchronized physical random access channel (PRACH) preamble structure in time domain for use in the uplink transmission of FIG. 2.

FIG. 3 illustrates an embodiment of a random access signal 300. The illustrated embodiment comprises cyclic prefix 302, random access preamble 304, and guard interval 306. Random access signal 300 is one transmission time interval 308 in duration. Transmission time interval 308 may comprise one or more sub-frame 203 durations. Note that the time allowed for random access signal transmission may vary, and this variable transmission time may be referred to as transmitting over a varying number of transmission time intervals, or as transmitting during a transmission time interval that varies in duration. This disclosure applies the term "transmission time interval" to refer to the time allocated for random access signal transmission of any selected duration, and it is understood that this use of the term is equivalent to uses referring to transmission over multiple transmission time intervals. The time period allotted for random access signal transmission may also be referred to as a random access time slot.

Cyclic prefix 302 and guard interval 306 are typically of unequal duration. Guard interval 306 has duration equal to approximately the maximum round trip delay of the cell while cyclic prefix 302 has duration equal to approximately the sum of the maximum round trip delay of the cell and the maximum delay spread. As indicated, cyclic prefix and guard interval durations may vary from the ideal values of maximum round trip delay and maximum delay spread while effectively optimizing the random access signal to maximize coverage. All such equivalents are intended to be within the scope of the present disclosure.

Round trip delay is a function of cell size, where cell size is defined as the maximum distance d at which a UE can interact with the cell's base station. Round trip delay can be approximated using the formula $t=d*20/3$ where t and d are expressed in microseconds and kilometers respectively. The round-trip delay is the two-way radio propagation delay in free space, which can be approximated by the delay of the earlier radio path. A typical earlier path is the line-of-sight path, defined as the direct (straight-line) radio path between the UE and the base station. When the UE is surrounded by reflectors, its radiated emission is reflected by these obstacles, creating multiple, longer traveling radio paths. Consequently, multiple time-delayed copies of the UE transmission arrive at the base station. The time period over which these copies are delayed is referred to as "delay spread," and for example, in some cases, 5 µs may be considered a conservative value thereof.

Cyclic prefix 302 serves to absorb multi-path signal energy resulting from reflections of a signal transmitted in the prior sub-frame, and to simplify and optimize equalization at the NodeB 101 receiver by reducing the effect of the channel transfer function from a linear (or aperiodic) correlation to a cyclic (or periodic) correlation operated across the observation interval 310. Guard interval 306 follows random access preamble 304 to prevent interference between random access preamble signal 304 and any transmission in the subsequent sub-frame on the same transmission frequencies used by random access preamble signal 304.

Random access preamble signal 304 is designed to maximize the probability of preamble detection by the NodeB and to minimize the probability of false preamble detections by the NodeB, while maximizing the total number of resource opportunities. Embodiments of the present disclosure utilize constant amplitude zero autocorrelation ("CAZAC") sequences to generate the random access preamble signal. CAZAC sequences are complex—valued sequences with the following two properties: 1) constant amplitude (CA), and 2) zero cyclic autocorrelation (ZAC).

The preamble sequence is a long CAZAC complex sequence allocated to the UE among a set of $R_s$ possible sequences. These sequences are built from cyclic shifts of a CAZAC root sequence. If additional sequences are needed, they are built from cyclic shifts of other CAZAC root sequences.

Well known examples of CAZAC sequences include, but are not limited to: Chu Sequences, Frank-Zadoff Sequences, Zadoff-Chu (ZC) Sequences, and Generalized Chirp-Like (GCL) Sequences. A known set of sequences with CAZAC property is the Zadoff-Chu N-length sequences defined as follows $$a_k = \exp\left[-j2\pi \frac{M}{N}\left(\frac{k(k+1)}{2} + qk\right)\right]$$

where M is relatively prime to N, N odd, and q any integer.

The latter constraint on N also guarantees the lowest and constant-magnitude cross-correlation $\sqrt{N}$ between N-length sequences with different values of M: $M_1$, $M_2$ such that $(M_1-M_2)$ is relatively prime to N. As a result, choosing N a prime number always guarantees this property for all values of M<N, and therefore maximizes the set of additional sequences, non orthogonal, but with optimal cross-correlation property. On top of providing additional sequences for a UE to chose among in a given cell, these sequences are also intended to be used in neighboring cells, so as to provide good inter-cell interference mitigation. In this disclosure, the terms: Zadoff-Chu, ZC, and ZC CAZAC, are used interchangeably. The term CAZAC denotes any CAZAC sequence, ZC or otherwise.

In various embodiments of the present disclosure, random access preamble signal 304 comprises a CAZAC sequence, such as a ZC sequence. Additional modifications to the selected CAZAC sequence can be performed using any of the following operations: multiplication by a complex constant, DFT, IDFT, FFT, IFFT, cyclic shifting, zero-padding, sequence block-repetition, sequence truncation, sequence cyclic-extension, and others. Thus, in one embodiment of the present disclosure, a UE constructs random access preamble signal 304 by selecting a CAZAC sequence, possibly applying a combination of the described modifications to the selected CAZAC sequence, modulating the modified sequence, and transmitting the resulting random access signal over the air.

Assuming that a preamble duration allowing reliable detection at the cell perimeter has been selected, random access channel coverage is maximized by allocating as much of the transmission time interval as possible to round trip delay. In a typical embodiment of the invention, the maximum round trip delay is taken to be one half of what is left of the transmission time interval 308 after subtracting the preamble duration 304 and the maximum delay spread.

Maximum Round Trip Delay=(TTI–Preamble Duration–Delay Spread)/2

Guard interval 306 is approximately a maximum round trip delay in duration to allow for mis-timing of the random access transmission while, in the worst-case of a cell-edge UE, the tail (or delay spread) of the preamble is absorbed by the cyclic prefix of the subsequent TTI. The cyclic prefix 302 is set to a duration of approximately the sum of the maximum round trip delay and the maximum delay spread. This dimensioning of the cyclic prefix 302 and the guard interval 306 serves to maximize the cell radius over which the random access channel is effective while maintaining isolation from adjacent TTIs.

An alternative embodiment of a random access signal may assign a duration of maximum round trip delay plus maximum spread delay to both the cyclic prefix and the guard interval. This dimensioning needlessly allocates a delay spread duration to the guard interval that could otherwise be used to increase round trip delay and thereby increase cell radius.

Further aspects of embodiments of the Random Access (RA) channel operation are described in related U.S. patent application Ser. No. 11/691,549 filed 27 Mar. 2007, now U.S. Pat. No. 8,098,745, entitled "Random Access Structure For Wireless Networks" which is incorporated herein by reference; and in related U.S. patent application Ser. No. 11/833,329, filed 3 Aug. 2007, now U.S. Pat. No. 8,259,598, entitled "Random Access Structure For Optimal Cell Coverage" which is incorporated by reference herein.

Referring again to FIG. 1, UE 109 is traveling in a direction with a ground speed as indicated by 112. The direction and ground speed results in a speed component that is relative to serving NodeB 101. Due to this relative speed of UE moving toward or away from its serving NodeB a Doppler shift occurs in the signals being transmitted from the UE to the NodeB resulting in a frequency shift and/or frequency spread that is speed dependent.

The excellent auto/cross-correlation of CAZAC sequences allows supporting a much larger number of signature opportunities, 64, than the 16 Walsh-Hadamard opportunities offered in the one version of a UMTS random access channel (RACH) preamble, and this with very little performance loss, even when two or more preambles are received in the same Random Access slot. However, the above performance assumes no or little Doppler spread or frequency shift, in presence of which, the CS-ZC sequence looses its zero-auto-correlation property. The latter degradation has been confirmed by simulations; in one such simulation the result is as follows: the wrong preamble detection rate when one or more preambles were sent rises up to 1% and 50% at 120 km/h and 360 km/h respectively, in the $E_P/N_0$ region of 18 dB, which is the RACH target SINR for detection and false alarm (in presence of noise only) probabilities of 0.99 and $10^{-2}$ respectively.

The current E-UTRA requirements regarding the performance of high-speed UE's is specified in as follows: The E-UTRAN shall support mobility across the cellular network and should be optimized for low mobile speed from 0 to 15 km/h. Higher mobile speed between 15 and 120 km/h should be supported with high performance. Mobility across the cellular network shall be maintained at speeds from 120 km/h to 350 km/h (or even up to 500 km/h depending on the frequency band) . . . . The mobile speed above 250 km/h represents special case, such as high-speed train environment. In such case a special scenario applies for issues such as mobility solutions and channel models. For the physical layer parameterization E-UTRAN should be able to maintain the connection up to 350 km/h, or even up to 500 km/h depending on the frequency band. Such requirements can be summarized as: the physical layer should be dimensioned so as to optimize the performance of low-speed UE's while keeping acceptable performance for high-speed UE's.

In order to fulfill the E-UTRAN requirements, the PRACH preamble sequence length design should address the following requirements: 1) maximize the number of Zadoff-Chu sequences with optimal cross-correlation properties; 2) minimize the interference to/from the surrounding scheduled data on the Physical Uplink Scheduled Channel (PUSCH).

Figure 4:
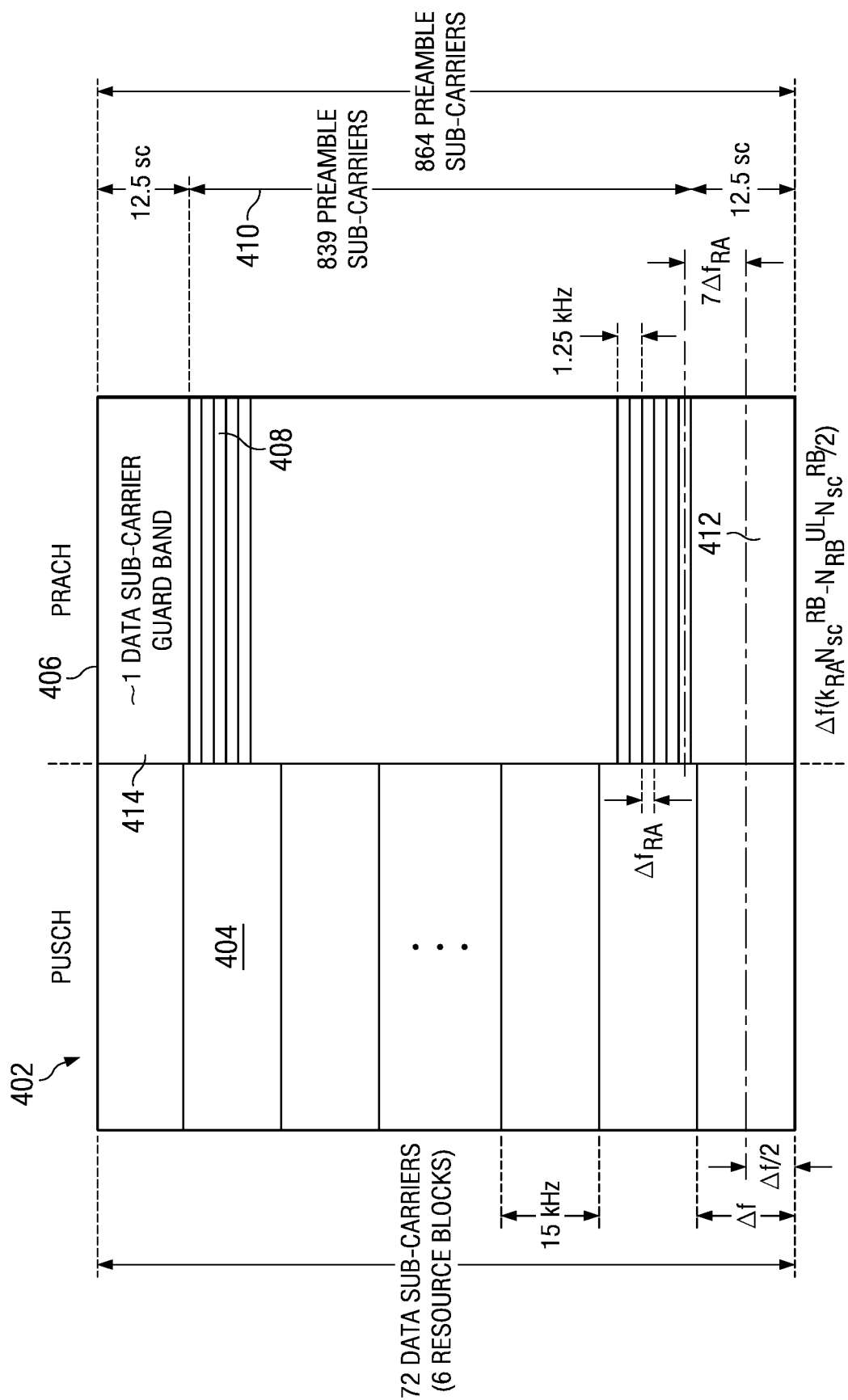
FIG. 4 is an illustration of the PRACH preamble structure in frequency domain for use in the uplink transmission of FIG. 2.

The former is guaranteed by choosing a prime-length sequence. For the latter, since data and preamble OFDM symbols are neither aligned nor have same durations, strict orthogonality cannot be achieved. At least, fixing the preamble duration to an integer multiple of the PUSCH symbol provides some commensurability between preamble and PUSCH sub-carriers thus providing orthogonality between some sub-carriers. This also assumes that the preamble sampling frequency is an integer multiple of the data symbol sub-carrier spacing. This is achieved with the chosen allocated bandwidth of seventy-two data symbol sub-carriers for the PRACH preamble. However, with 800 µs duration, the resulting sequence length is 864, which does not provide the prime number of requirement one above. Therefore shortening the preamble to a prime length slightly increases the interference between PUSCH and NSRA by slightly decreasing the preamble sampling rate FIG. 4 is a more detailed illustration of the PRACH preamble structure for use in the uplink transmission of FIG. 2. Preamble structure 402 represents the output of the data symbol FFT of the transmitter illustrating the seventy-two sub-carriers 404 that are each 15 kHz, while preamble structure 406 represents the output of the preamble DFT of the transmitter illustrating the 864 sub-carriers 408 that are each 1.25 kHz. This embodiment uses guard bands 412, 414 to avoid the data interference at preamble edges. A cautious design of preamble sequence length not only retains a high inherent processing gain, but also allows a decent avoidance of strong data interference. In addition, the loss of spectral efficiency by guard sub-carriers reservation can also be well controlled at a fine granularity. In this embodiment, each sub-carrier 408 is 1.25 kHz for 800 µs preamble duration.

The sequence length 410 of 839 preamble symbol sub-carriers also is a best trade-off choice since it corresponds to 69.91 symbol sub-carriers in each symbol and offers 72-69.91=2.09 symbol sub-carriers protection, which is very close to 1 symbol sub-carrier protection one each side of the preamble. Further higher/lower prime sequence length adjustments do not provide as good of integer number sub-carrier protection. More exactly, the 839 preamble sub-carriers 410 are mapped onto the 864 allocated sub-carriers 408 as follows: twelve and a half zero sub-carriers 412; 839 preamble sub-carriers 410; twelve and a half zero sub-carriers 414. In another embodiment, guard band 412 may be thirteen sub-carries while guard band 414 is twelve sub-carriers, or visa-versa. In yet another embodiment, the guard bands may comprise other numerical combinations of sub-carriers.

The time-continuous PRACH preamble signal s(t) is defined by:

$$s(t) = \beta_{PRACH} \sum_{k=0}^{N_{ZC}-1} \sum_{n=0}^{N_{ZC}-1} x_{u,v}(n) \cdot e^{-j\frac{2\pi nk}{N_{ZC}}} \cdot e^{j2\pi(k+\varphi+K(k_0+1/2))\Delta f_{RA}(t-T_{CP})}$$

where $$0 \leq t < T_{SEQ} + T_{CP},$$

$\beta_{PRACH}$ is an amplitude scaling factor and $$k_0 = k_{RA}N_{sc}^{RB} - N_{RB}^{UL}N_{sc}^{RB}/2.$$

$T_{SEQ}$ is the sequence duration and $T_{CP}$ is the cyclic prefix duration. $N_{sc}^{RB}$ is the number of data subcarriers per resource block (RB) and $N_{RB}^{UL}$ is the total number of resource blocks available for UL transmission. The location in the frequency domain is controlled by the parameter $k_{RA}$, expressed as a resource block number configured by higher layers and fulfilling $$0 \leq k_{RA} \leq N_{RB}^{UL} - 6$$

The factor $$K = \Delta f/\Delta f_{RA}$$

accounts for the difference in subcarrier spacing between the random access preamble and uplink data transmission. The variable φ defines a fixed offset determining the frequency-domain location of the random access preamble within the resource blocks. The PRACH signal takes the following value for φ:φ=7.

Number of Root Sequences and Cyclic Shift Values

If a base station can select any number of cyclic shifts from 0 to 838, then ten or more signaling bits would be required on the broadcast channel (BCH). It has now been determined that a fixed set of preamble parameter configurations can be established for use across a complete range of cell sizes. An approach for signaling a cyclic shift value $N_{cs}$ to be used in a cell is to reduce the full range of possible cyclic shifts to a pre-defined set of cyclic shift configurations. Sixteen different configurations allow reducing the cyclic shift signaling to four bits. The criterion for choosing these cyclic shift values is to minimize the number of Zadoff-Chu root sequences while maximizing the associated cell range. In other words, a configuration using r different root sequences should be fully filled with cyclic shifted preambles before another root sequence is added. Given that sixty-four signatures must be generated, a first choice is all cyclic shift values corresponding to splitting the sequence length into sub-multiples of 64: $N_{cs}=N/k$; k=1, 2, 4, 8, 16, 32, 64. Table 1 shows the seven resulting $N_{cs}$ values where all root sequences generate the same number of cyclic shifted preambles. The number of root sequences is given for the regular case where no cyclic shift restrictions apply (low to medium speed cell).

In the following tables, the cell size is illustrative and each network operator can have its own way of calculating it, given a number of guard samples, typical delay spread, etc. The cell size column gives an example of cell sizes derivations assuming two guard samples and 5 μs delay spread.

TABLE 1

Cyclic shift values maximizing
the cell size while minimizing the
number of root sequences

| # of cyclic shifts per root seq. | # of root sequences (no cyclic shift restrictions) | Cyclic shift (samples) | Cell size (km) |
|---|---|---|---|
| 64 | 1 | 13 | 0.82 |
| 32 | 2 | 26 | 2.68 |
| 16 | 4 | 52 | 6.40 |
| 8 | 8 | 104 | 13.83 |
| 4 | 16 | 209 | 28.85 |
| 2 | 32 | 419 | 58.89 |
| 1 | 64 | 0 | 118.96 |

However, the above list is somewhat restrictive in that it does not provide any intermediate configuration between two and four root sequences, or between four and eight root sequences. Therefore, the above rule for maximizing the cell size for a given number of root sequences is extended to all possible numbers of root sequences. For a given number of root sequences, the cyclic shift value is chosen to provide a close to equal number of cyclic shifts per root sequence, thus maximizing the corresponding cell size. The next number of root sequences is the minimum number of root sequences required to carry 64 signatures when the cyclic shift of the previous configuration is incremented by one sample. This results in some skipped numbers of root sequences. This algorithm actually provides fifteen different numbers of root sequences. In order to make best use of the four bits available to carry this information, another configuration is added. In this embodiment, an intermediate configuration in between one and two root sequences is added. This is to provide a finer granularity at small cell sizes. Also, it provides an additional configuration for the two-root sequence case, with an unbalanced number of cyclic shifted preamble opportunities between the two root sequences, thus reducing the root sequence collision probability. If such an unbalanced allocation of cyclic shifted preambles to root sequences is to be used, it is the most useful for the two-root sequence case. Thus, the fixed set of preamble parameter configurations sample the continuous cell size range covered by the network in a non-linear way, such that a finer configuration granularity is provided for smaller cells, reflecting the broader deployment of smaller cells compared to larger cells. Table 2 provides the final cyclic shift set.

TABLE 2

PRACH preamble parameters for
pre-defined cell configurations

| Configuration # | root sequences | # of cyclic shifts per root seq. | # of root sequences (no cyclic shift restrictions) | Cyclic shift (samples) | Cell size (km) |
|---|---|---|---|---|---|
| 1 | All | 64 | 1 | 13 | 0.82 |
| 1 | 20 | 2 | 2 | 19 | 1.68 |
| 2 | 44 | | | | |
| 3 | All | 32 | 2 | 26 | 2.68 |
| 4 | All | 21 | 3 | 38 | 4.39 |
| | but last | | | | |
| | Last | 22 | | | |
| 5 | All | 16 | 4 | 52 | 6.40 |
| 6 | All but last | 13 | 5 | 64 | 8.11 |
| | Last | 12 | | | |
| 7 | All but last | 11 | 6 | 76 | 9.83 |
| | Last | 9 | | | |
| 8 | All but last | 9 | 7 | 83 | 10.83 |
| | Last | 10 | | | |
| 9 | All | 8 | 8 | 104 | 13.83 |
| 10 | 1-2 | 4 | 10 | 119 | 15.98 |
| | 3-10 | 7 | | | |
| 11 | All but last | 6 | 11 | 139 | 18.84 |
| | Last | 4 | | | |
| 12 | All but last | 5 | 13 | 167 | 22.84 |
| | Last | 4 | | | |
| 13 | All | 4 | 16 | 209 | 28.85 |
| 14 | All but last | 3 | 22 | 279 | 38.86 |
| | Last | 1 | | | |
| 15 | All | 2 | 32 | 419 | 58.89 |
| 16 | All | 1 | 64 | 0 | 118.96 |

Table 3 shows, for the regular case where no cyclic shift restrictions apply (low to medium speed cell) an alternative embodiment of a selected set of number of root sequences, chosen to provide a close to equal number of cyclic shifts per root sequence. When this is not possible, the rule applied is to have an equal number of cyclic shifts for all root sequences but the last one, and to adjust the remaining number of cyclic shifts in the last root sequence to yield 64 in total. The associated cell size is provided, for information, and is derived from cyclic shift value assuming two guard samples and 5 μs maximum delay spread. The goal is to always try to minimize the number of root sequences for a given cell range. Since there are eleven different configurations, the configuration can be signaled on 4 bits.

TABLE 3

PRACH preamble parameters for
pre-defined cell configurations

| Configuration # | ZC sequences | # of cyclic shifts per ZC seq. | # of ZC sequences (no cyclic shift restrictions) | Cyclic shift (samples) | Cell size (km) |
|---|---|---|---|---|---|
| 1 | All | 64 | 1 | 13 | 0.8 |
| 2 | All | 32 | 2 | 26 | 2.7 |
| 3 | All but last | 21 | 3 | 38 | 4.4 |
| | Last | 22 | | | |
| 4 | All | 16 | 4 | 52 | 6.4 |
| 5 | All but last | 13 | 5 | 64 | 8.1 |

TABLE 3-continued

PRACH preamble parameters for pre-defined cell configurations

| Configuration # | ZC sequences | # of cyclic shifts per ZC seq. | # of ZC sequences (no cyclic shift restrictions) | Cyclic shift (samples) | Cell size (km) |
|---|---|---|---|---|---|
|  | Last | 12 |  |  |  |
| 6 | All but last | 11 | 6 | 76 | 9.8 |
|  | Last | 9 |  |  |  |
| 7 | All | 8 | 8 | 104 | 13.8 |
| 8 | All but last | 6 | 11 | 139 | 18.8 |
|  | Last | 4 |  |  |  |
| 9 | All but last | 5 | 13 | 167 | 22.8 |
|  | Last | 4 |  |  |  |
| 10 | All | 4 | 16 | 209 | 28.8 |
| 11 | All | 1 | 64 | 839 | 119.0 |

For high speed cells where cyclic shift restrictions apply, more ZC root sequences will be configured than what is indicated in the Table 2 and Table 3. The NodeB signals both the cell configuration number, which identifies the cyclic shift value, and the additional number of ZC root sequences. Whenever the number of additional ZC root sequences is greater than zero, the UE infers that cyclic restrictions apply and identifies which cyclic shifts must not be used according to operating procedures of the telecommunications network in which the UE is operating.

In an alternate embodiment, the NodeB only signals with a one-bit flag if the current cell is a high speed cell or a normal cell. In the former case, the UE infers that cyclic restrictions apply and identifies which cyclic shifts must not be used and associated additional root sequences according to operating procedures of the telecommunications network in which the UE is operating.

Table 2 and Table 3 provide two representative examples of a fixed set of preamble parameters. Other embodiments may use variations of these examples by agreeing upon a different fixed set of preamble parameters that is stored in each UE used in the network. In another embodiment, the number of configurations may be increased to up to thirty-two and therefore five bits be used for signaling, for example.

Figure 5:
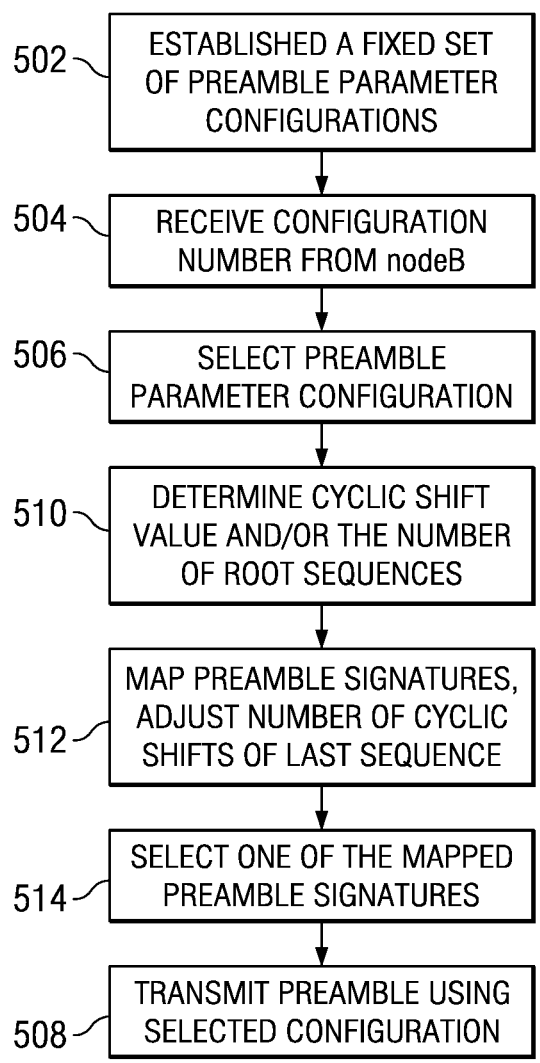
FIG. 5 is a flow diagram illustrating operation of a signaling process for selecting a preamble configuration for transmission of the preamble of FIG. 3.

FIG. 5 is a flow diagram illustrating operation of a signaling process for selecting a preamble configuration for transmission of the PRACH preamble of FIG. 3 from user equipment to base stations. The fixed set of preamble parameter configurations for use across a complete range of cell sizes within the cellular network is established 502 as discussed above. Once established, each UE that will operate in the network is preloaded with the fixed set of preamble configurations. In the present embodiment, this is done by loading the fixed set of preamble configurations into a storage circuit, such as a flash read only memory (EPROM) or other type of random access memory device, in an offline procedure. In another embodiment, the storage circuit may by loaded or updated via data downloads from a eNB or other control system within the network using over the air transmissions. The fixed set of preamble parameter configurations may be stored on the UE in the form of a record or table that can be accessed using the configuration number as an index, for example.

In addition to the fixed set of parameter configurations that is preloaded onto all UEs in the cellular network, the ordering of root sequences and the rule for physical mapping of the signatures onto the root sequences is preloaded onto all UEs that will operate within the network.

As a UE enters a cell, an eNB serving that cell broadcasts control signaling information to the UE to notify the UE as to what preamble configuration to use within that cell. The eNB also broadcasts the index of the first root sequence of the set of preloaded root sequences and information of whether high speed cyclic shift restrictions apply within the cell. The UE receives 504 a configuration number from the eNB that is correlated to the size of the cell, as described in Table 2 for this embodiment. For example, if the cell size is between 4.26 km and 6.2 km, then the eNB sends a four-bit configuration number of "0×5" which implicitly indicates to the UE to form a preamble based on configuration parameters of sixteen cyclic shifts per root sequence using four root sequences, as illustrated in Table 2.

After receiving the configuration number, the UE will store this value for future reference. When it is time to transmit a PRACH preamble, the UE selects a preamble parameter configuration specified by the received configuration number from the fixed set of preamble parameter configurations. Following the same example, the UE will select parameter configuration "5" meaning that it will use the implicit values of four root sequences and sixteen cyclic shifts per root sequence or in other words each cyclic shift will shift fifty-two sample positions.

The UE will then transmit 508 an NSRA preamble to the eNB using the preamble parameter configuration indicated by the configuration number.

Before transmitting the preamble, the UE determines 510 the cyclic shift value and/or the number of root sequences of the selected preamble parameter configuration by consulting the stored fixed set of preamble parameter configurations using the received configuration number as an index in this embodiment. Other embodiments may use other schemes to associate the received configuration number with a corresponding preamble configuration of the fixed set of preamble parameter configurations that is stored on the UE.

In this embodiment there are sixty-four preamble signatures that may be used by any UE within a given cell. The UE maps 512 the sixty-four preamble signatures to subsequent cyclic shifts of a given root sequence according to the number of cyclic shifts until the given root sequence is full. Generally one root sequence will not accommodate all sixty-four signatures and mapping continues to additional root sequences for all of the number of root sequences until a last root sequence. If the last sequence has a different number of cyclic shifts as indicated by the selected parameter configuration, then the UE may adjust 512 the number of cyclic shifts mapped onto the last root sequence such that the predetermined number (64) of preamble signatures are mapped.

After mapping the preamble signatures, the UE selects 514 one of the mapped preamble signatures for use in transmitting 508 the preamble. There are sixty-four total possible signatures. This set is split as follows: 1) contention-based signatures; and 2) contention-free signatures. The contention-based signature set is split into two sub-sets small and large resource allocation of msg3.

Contention-free signatures are explicitly allocated to a UE by the eNB in the case of handover and new downlink data in buffer for a non-synchronized UE.

Contention-based signatures are selected by the UE as follows. First, the UE chooses the relevant subset based on the size of the UL resource it needs to send as a variable size message (msg3) on the physical uplink shared channel (PUSCH) after the preamble. The UE estimates the size of the UL resource based on msg3 payload and quality of the radio link; the poorer the radio link quality, the smaller the allocated bandwidth. Then, the UE picks a signature randomly within the selected signature subset.

Regardless of whether the request is contention-based or contention-free, in this embodiment the transmission will use the same physical random access channel (PRACH) and preamble structure, as described herein. Of course, in other embodiments the contention-free transmissions may be transmitted using a variation of this scheme or a different scheme.

Figure 6:
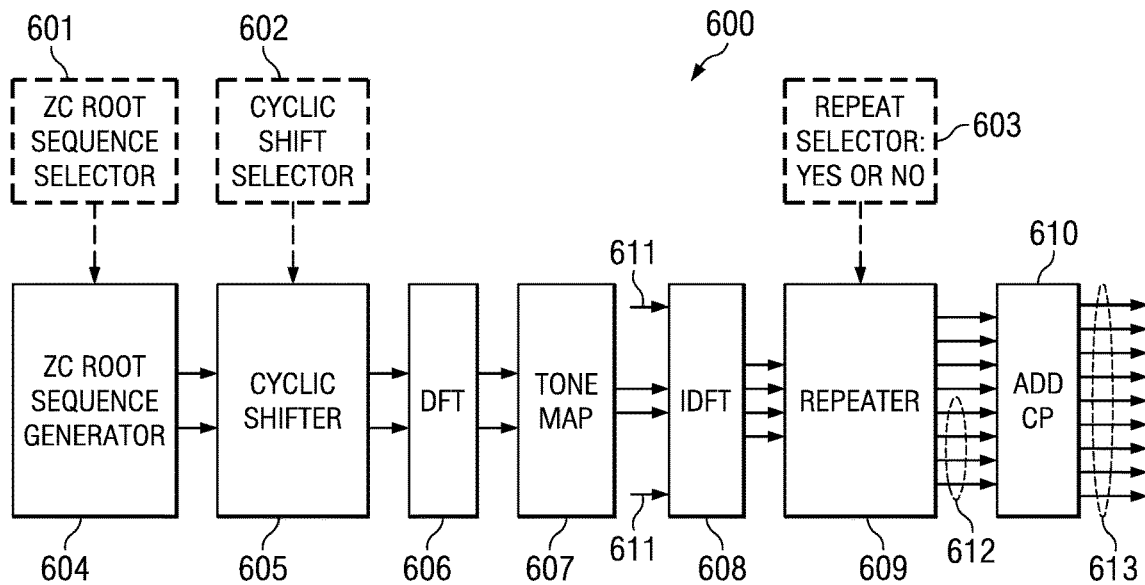
FIG. 6 is a block diagram of an illustrative transmitter for transmitting the preamble structure of FIG. 3.

FIG. 6 is a block diagram of an illustrative transmitter 600 for transmitting the preamble structure of FIG. 3. Apparatus 600 comprises ZC Root Sequence Selector 601, Cyclic Shift Selector 602, Repeat Selector 603, ZC Root Sequence Generator 604, Cyclic Shifter 605, DFT in 606, Tone Map 607, other signals or zero-padding in 611, IDFT in 608, Repeater in 609, optional repeated samples 612, Add CP in 610, and the PRACH signal in 613. Elements of the apparatus may be implemented as components in a fixed or programmable processor. In some embodiments, the IDFT block in 608 may be implemented using an Inverse Fast Fourier Transform (IFFT), and the DFT block in 606 may be implemented using a Fast Fourier Transform (FFT). Apparatus 600 is used to select and perform the PRACH preamble signal transmission as follows. The UE performs selection of the CAZAC (e.g. ZC) root sequence using the ZC Root Sequence Selector 601 and the selection of the cyclic shift value using the Cyclic Shift Selector 602. Next, the UE generates the ZC sequence using the ZC Root Sequence Selector 604. Then, if necessary, the UE performs cyclic shifting of the selected ZC sequence using the Cyclic Shifter 605. The UE performs DFT (Discrete Fourier Transform) of the cyclically shifted ZC sequence in DFT 606. The result of the DFT operation is mapped onto a designated set of tones (sub-carriers) using the Tone Map 607. Additional signals or zero-padding 611, may or may not be present. The UE next performs IDFT of the mapped signal using the IDFT 608. The size of the IDFT in 608 may optionally be larger than the size of DFT in 606.

In other embodiments, the order of cyclic shifter 605, DFT 606, tone map 607 and IDFT 608 may be arranged in various combinations. For example, in one embodiment a DFT operation is performed on a selected root sequence, tone mapping is then performed, an IDFT is performed on the mapped tones and then the cyclic shift may be performed. In another embodiment, tone mapping is performed on the root sequence and then an IDFT is performed on the mapped tones and then a cyclic shift is performed.

Figure 7A:
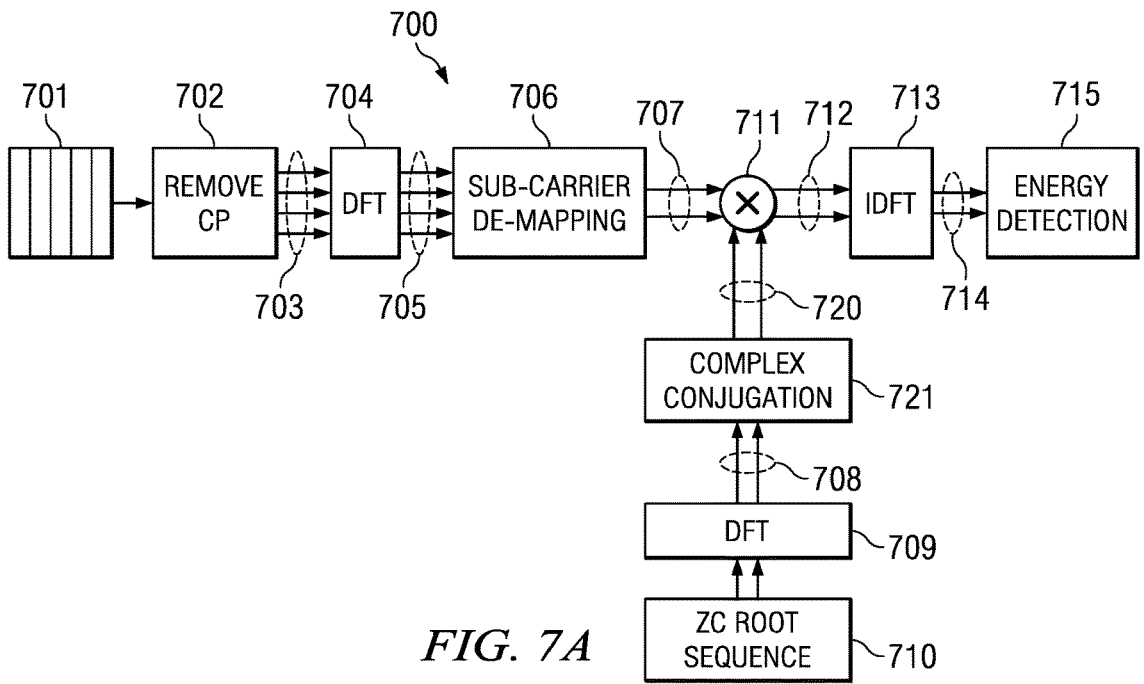
FIG. 7A is a block diagram of an illustrative receiver for receiving the preamble structure of FIG. 3.

FIG. 7A is a block diagram of an illustrative receiver for receiving the preamble structure of FIG. 3. This receiver advantageously makes use of the time and frequency domain transforming components used to map and de-map data blocks in the up-link sub-frame to take full profit of the PRACH format and CAZAC sequence by computing the PRACH power delay profile through a frequency-domain computed periodic correlation. Indeed, the power delay profile pdp(l) of the received sequence is defined as:

$$pdp_{yx}(l) = |r_{yx}(l)| = \left| \sum_{n=0}^{N_{ZC}-1} y(n)x^*\big((n+l)_{N_{ZC}}\big) \right| \quad (1)$$

where $r_{yx}(l)$ is the discrete periodic autocorrelation function at lag l of the received sequence y(n) and the reference searched CAZAC sequence x(n), and where $(\ )^*$ and $(\ )_n$ denote the complex conjugate and modulo-n respectively. Given the periodic convolution of the complex sequences y(n) and x(n) defined as:

$$[y(n)*x(n)](l) = \sum_{n=0}^{N_{ZC}-1} y(n)x\big((l-n)_{N_{ZC}}\big) \quad (2)$$

$r_{yx}(l)$ can be expressed as follows:

$$r_{yx}(l) = (y(n)*x^*(-n))(l) \quad (3)$$

Using the following properties of the Discrete Fourier Transform (DFT):
Complex Sequence DFT $$x(n) \rightarrow X(k)$$

$$y(n) \rightarrow Y(k)$$

$$x^*(-n) \rightarrow X^*(k)$$

$$y(n)*x(n) \rightarrow Y(k)X(k) \quad (4)$$

$r_{yx}(l)$ can be computed in frequency domain as:

$$r_{yx} = \text{DFT}^{-1}\{\text{DFT}(y(n))\text{DFT}(x(n))^*\} \quad (5)$$

Figure 7B:
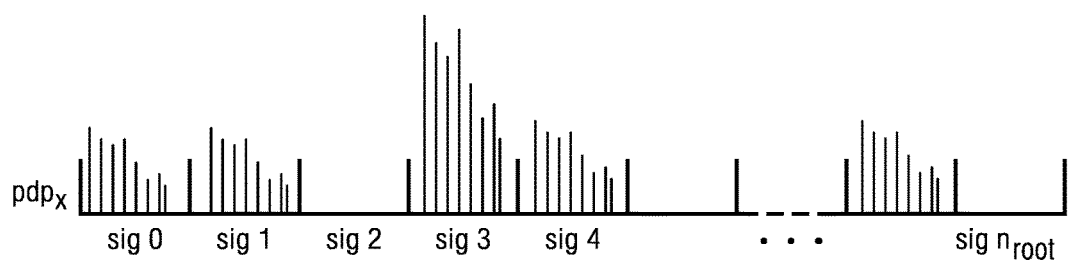
FIG. 7B is a plot of a power delay profile of an example root sequence received by the receiver of FIG. 7A.

An additional complexity reduction comes from the fact that different PRACH signatures are generated from cyclic shifts of a common root sequence. As illustrated in FIG. 7B, the frequency-domain computation of the power delay profile of a root sequence provides in one shot the concatenated power delay profiles of all signatures carried on the same root sequence.

The received PRACH signal 701, comprising cyclic prefix and PRACH preamble signal, is input to cyclic prefix removal component 702 which strips the cyclic prefix from the PRACH signal producing signal 703. Frequency domain transforming component DFT 704 couples to cyclic prefix removal component 702. Frequency domain transforming component 704 converts signal 703 into sub-carrier mapped frequency tones 705. Sub-carrier de-mapping component 706 is coupled to frequency domain transforming component 704. Sub-carrier de-mapping component 706 de-maps sub-carrier mapped frequency tones 705 to produce useful frequency tones 707. Product component 711 is coupled to both sub-carrier de-mapping component 707 and frequency domain transforming component 709. Frequency domain transforming component (DFT) 709 converts a preamble root sequence 710, such as a prime length Zadoff-Chu sequence, into a corresponding set of pilot frequency tones 708. Complex conjugation of pilot frequency tones 708 is performed using 721, to produce samples 720. Product component 711 computes a tone by tone complex multiplication of received frequency tones 707 with samples 720 to produce a set of frequency tones 712. Time domain transforming component (IDFT) 713 is coupled to product component 711. Time domain transforming component 713 converts multiplied frequency tones 712 into correlated time signal 714. Correlated time signal 714 contains concatenated power delay profiles of the cyclic shift replicas of the preamble root sequence 710. Energy detection block 715 is coupled to time domain transforming block 713. Energy detection block 715 identifies received preamble sequences by detecting the time of peak correlation between received schedule request signal 701 and preamble root sequence 710.

Note that frequency domain transforming component 709 is called for when using the transmitters illustrated in FIG. 6. When using an alternative embodiment transmitter that does not perform a DFT, frequency domain transforming component 709 may be omitted.

Figure 8:
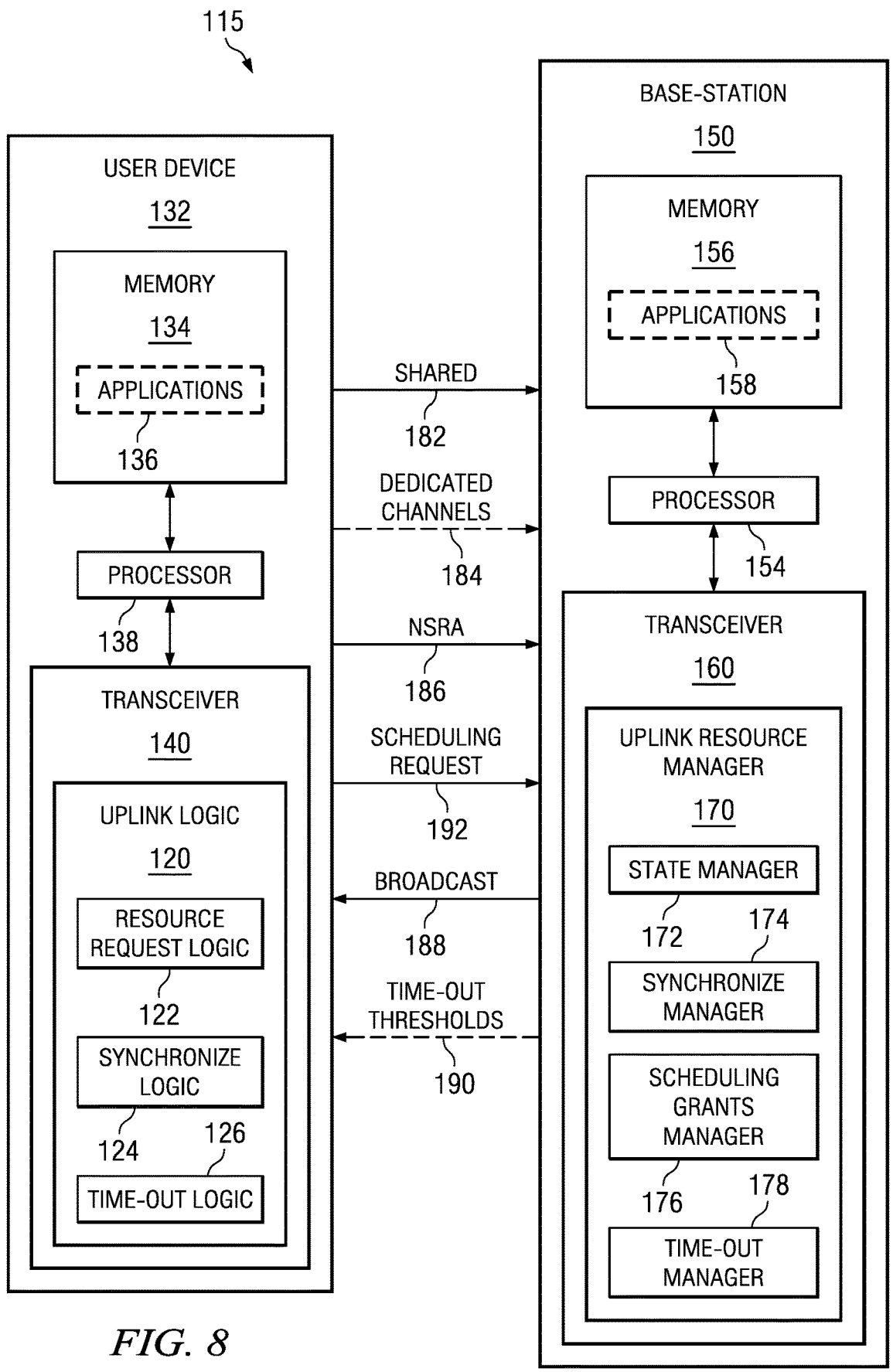
FIG. 8 is a block diagram illustrating the network system of FIG. 1.

FIG. 8 is a block diagram illustrating the network system of FIG. 1. As shown in FIG. 8, the wireless networking system 115 comprises a user device 132 in communication with a base-station 150. The user device 132 may represent any of a variety of devices such as a server, a desktop computer, a laptop computer, a cellular phone, a Personal Digital Assistant (PDA), a smart phone or other electronic devices. In some embodiments, the electronic device 132 communicates with the base-station 150 based on a LTE or E-UTRAN protocol. Alternatively, another communication protocol now known or later developed is used.

As shown, the electronic device 132 comprises a processor 138 coupled to a memory 134 and a transceiver 140. The memory 134 stores applications 136 for execution by the processor 138. The applications 136 could comprise any known or future application useful for individuals or organizations. As an example, such applications 136 could be categorized as operating systems, device drivers, databases, multimedia tools, presentation tools, Internet browsers, emailers, Voice Over Internet Protocol (VOIP) tools, file browsers, firewalls, instant messaging, finance tools, games, word processors or other categories. Regardless of the exact nature of the applications 136, at least some of the applications 136 may direct the user device 132 to transmit uplink signals to the base-station 150 periodically or continuously via the transceiver 140. Over time, different uplink transmissions from the user device 132 may be high priority (time-critical) or low priority (non-time critical). In at least some embodiments, the user device 132 identifies a Quality of Service (QoS) requirement when requesting an uplink resource from the base-station 150. In some cases, the QoS requirement may be implicitly derived by the base-station 150 from the type of traffic supported by the user device 132. As an example, VOIP and gaming applications often involve high priority uplink transmissions while High Throughput (HTP)/Hypertext Transmission Protocol (HTTP) traffic involves low priority uplink transmissions.

As shown in FIG. 8, the transceiver 140 comprises uplink logic 120, which enables the user device 132 to request an uplink resource from the base-station 150 and upon a successful request to send uplink transmissions to the base-station 150. In FIG. 8, the uplink logic 120 comprises resource request logic 122, synchronize logic 124, and time-out logic 126. As would be understood by one of skill in the art, the components of the uplink logic 120 may involve the physical (PHY) layer and/or the Media Access Control (MAC) layer of the transceiver 140.

In at least some embodiments, the resource request logic 122 detects when the user device 132, in absence of any valid uplink resource grant, needs to send an uplink transmission to the base-station 150 and submits a corresponding scheduling request. If the user device 132 is not uplink synchronized, the scheduling request is made using the non-synchronized physical random access channel (PRACH) 186, which is potentially contentious depending on how many other user devices also need to use the PRACH at the same time (e.g., for scheduling requests or uplink synchronization maintenance). Alternatively, if the user device 132 is uplink synchronized, the resource request may be submitted via a contention-free scheduling request channel 192 which may be available to the user device 132. In either case, the request is made using preamble structure 300, depending on the relative speed of the UE to the NodeB and how a particular cell is configured, as described earlier. A command received from the base station indicates what preamble configuration is to be used in a given cell, as described in more detail above.

In at least some embodiments, the scheduling request channel 192 is part of the dedicated channels 184. The dedicated channels 184 represent uplink synchronized channels which are dedicated to a particular purpose and which are selectively accessible to one or more user devices. Another example of dedicated channel is the sounding reference signal (SRS). The SRS is a standalone reference signal (or pilot) which provides means to the base-station to perform channel quality information (CQI) estimation for frequency dependent scheduling, to maintain uplink synchronization, and to implement link adaptation and power control for each user.

If the user device 132 previously obtained a resource allocation from the base station 150 and the resource allocation has not expired, uplink transmissions can be sent via a shared channel 182 (i.e., a channel shared with other user devices based on time and division multiplexing) in the form of a MAC Packet Data Unit (PDU) transmission. In at least some embodiments, the resource request logic 122 also detects when the user device 132, with at least one valid uplink resource grant, needs to update its current allocated uplink resource(s) (e.g., if the user device 132 needs more resources because it received more data in its transmission buffer) and submits a corresponding scheduling request. Since the user device 132 already has valid uplink grants, it is uplink synchronized, and the resource request may be either embedded in a MAC PDU sent on these valid grants on the uplink shared channel 182, or submitted via the scheduling request channel 192.

To use the shared channel 182 or the scheduling request channel 192, the user device 132 receives a unique identifier from the base-station 150. In some embodiments, the unique identifier is explicitly provided by the base-station 150 (e.g., the base-station 150 broadcasts a multi-bit unique identifier to the user device 132 for use with the shared channel 182). In alternative embodiments, the unique identifier is implicitly provided by the base-station 150 (e.g., the base-station 150 provides a one-to-one mapping between the user device 132 and a physical uplink resource of the scheduling request channel 192).

The synchronize logic 124 enables the user device 132 to maintain a particular synchronization for uplink transmissions via the shared channel 182 or other uplink synchronized channels (e.g., the SRS or the scheduling request channel 192). In some embodiments, the synchronize logic 124 supports time and frequency adjustments based on a predetermined protocol and/or instructions from the base-station 150. Once the user device 132 is synchronized, the synchronization can be periodically updated based on timers and/or information exchanged between the user device 132 and the base-station 150. For example, if the user device 132 is synchronized and has at least one scheduling grant from the base-station 150, then the synchronize manager 174 of the base-station 150 can maintain the user device's synchronization based on ongoing uplink transmissions from the user device 132 via the shared channel 182.

If the user device 132 is synchronized but does not have a scheduling grant from the base-station 150, then the synchronize manager 174 of the base-station 150 can maintain the user's synchronization based on a PRACH transmission 186. Alternatively, if the user device 132 is synchronized but does not have a scheduling grant from the base-station 150, then the synchronize manager 174 of the base-station 150 can maintain the user's synchronization based on information transmitted via one of the dedicated channels 184 (e.g., using a SRS or an autonomous synchronization request from the user device 132 through the scheduling request channel 192). By appropriately synchronizing uplink transmissions of the user device 132, interference to and from the transmissions of other user devices can be avoided and orthogonal multiplexing is maintained.

As shown in FIG. 8, the base-station 150 comprises a processor 154 coupled to a memory 156 and a transceiver 170. The memory 156 stores applications 158 for execution by the processor 154. The applications 158 could comprise any known or future application useful for managing wireless communications. At least some of the applications 158 may direct the base-station to manage transmissions to or from the user device 132.

As shown in FIG. 8, the transceiver 160 comprises an uplink resource manager 170, which enables the base-station 150 to selectively allocate uplink resources to the user device 132. In FIG. 8, the uplink resource manager 170 comprises a state manager 172, a synchronize manager 174, a scheduling grants manager 176 and a time-out manager 178. As would be understood by one of skill in the art, the components of the uplink resource manager 170 may involve the physical (PHY) layer and/or the Media Access Control (MAC) layer of the transceiver 160.

Transceiver 160 includes a receiver as described in more detail in FIG. 7. As discussed previously, a management application on the NodeB determines what preamble configuration of a fixed set of preamble parameter configurations will be used in a particular cell, based on cell sized. The NodeB broadcasts this information to all UE in the cell as part of system and cell-specific information on a broadcast channel (BCH).

In at least some embodiments, the state manager 172 determines whether to assign the user device 132 to a synchronized state or to a non-synchronized state. In at least some embodiments, the user device 132 can request to be assigned to the synchronized state using PRACH 186.

If the user device 132 is accepted into the synchronized state, a reduced identifier is provided to the user device 132. The reduced identifier enables the user device 132 to send uplink transmissions via the shared channel 182 and new resource requests via the scheduling requests channel 192. In some embodiments, the state manager 172 enables the reduced identifier to be explicitly provided to the user device 132 (e.g., broadcasting a multi-bit unique identifier to the user device 132 for use with the shared channel 182). In alternative embodiments, the state manager 172 enables the unique identifier to be implicitly provided to the user device 132 (e.g., providing a one-to-one mapping between the user device 132 and a physical uplink resource of the base-station 150). If the user device 132 becomes non-synchronized due to a time-out or any other reason, the state manager 172 reassigns the user device 132 to the non-synchronized state and releases the reduced identifier and any associated uplink resource that was assigned to the user device 132.

The synchronize manager 174 maintains user devices in synchronization for uplink transmissions via the shared channel 182 or any dedicated channel 184. In order to do so, the synchronize manager 174 estimates the timing error of the uplink transmissions of the user device 132 on either the shared channel 182, a dedicated channel 184 (e.g., SRS) or the PRACH 186. Then, the synchronize manager 174 sends back a timing advance (TA) command to the user device 132, that will be executed by the synchronize logic 124. By appropriately synchronizing uplink transmissions of the user device 132, the synchronize manager 174 avoids interferences between uplink transmissions of the user device 132 and uplink transmissions of other user devices and orthogonal multiplexing is maintained.

The scheduling grants manager 176 selectively determines when synchronized user devices will be scheduled on the shared channel 182. For example, the scheduling grants manager 176 may assign scheduling grants in response to new resource requests from user device 132 sent through the scheduling request channel 192.

If more than a threshold amount of time passes during which the user device 132 does not send any uplink transmissions, a time-out may occur. The time-out manager 178 determines when a time-out occurs based on one or more time-out thresholds 190. In at least some embodiments, the time-out manager 178 implements timers or counters to track the amount of time that passes between uplink transmissions for all synchronized user devices. The time-out thresholds 190 may be predetermined or may be determined, for example, based on the number of user devices in communication with the base-station.

In at least some embodiments, a time-out threshold causes user devices to enter the non-synchronized state. Typically, the entrance of user devices to the non-synchronized state does not depend on exchanging messages between the base station 150 and user devices. In other words, both user devices and the base-station 150 can track the passage of time separately and independently determine that a user device is in a non-synchronized state. In case a user device transitions to the non-synchronized state, any existing uplink grant of this user device is released.

Figure 9:
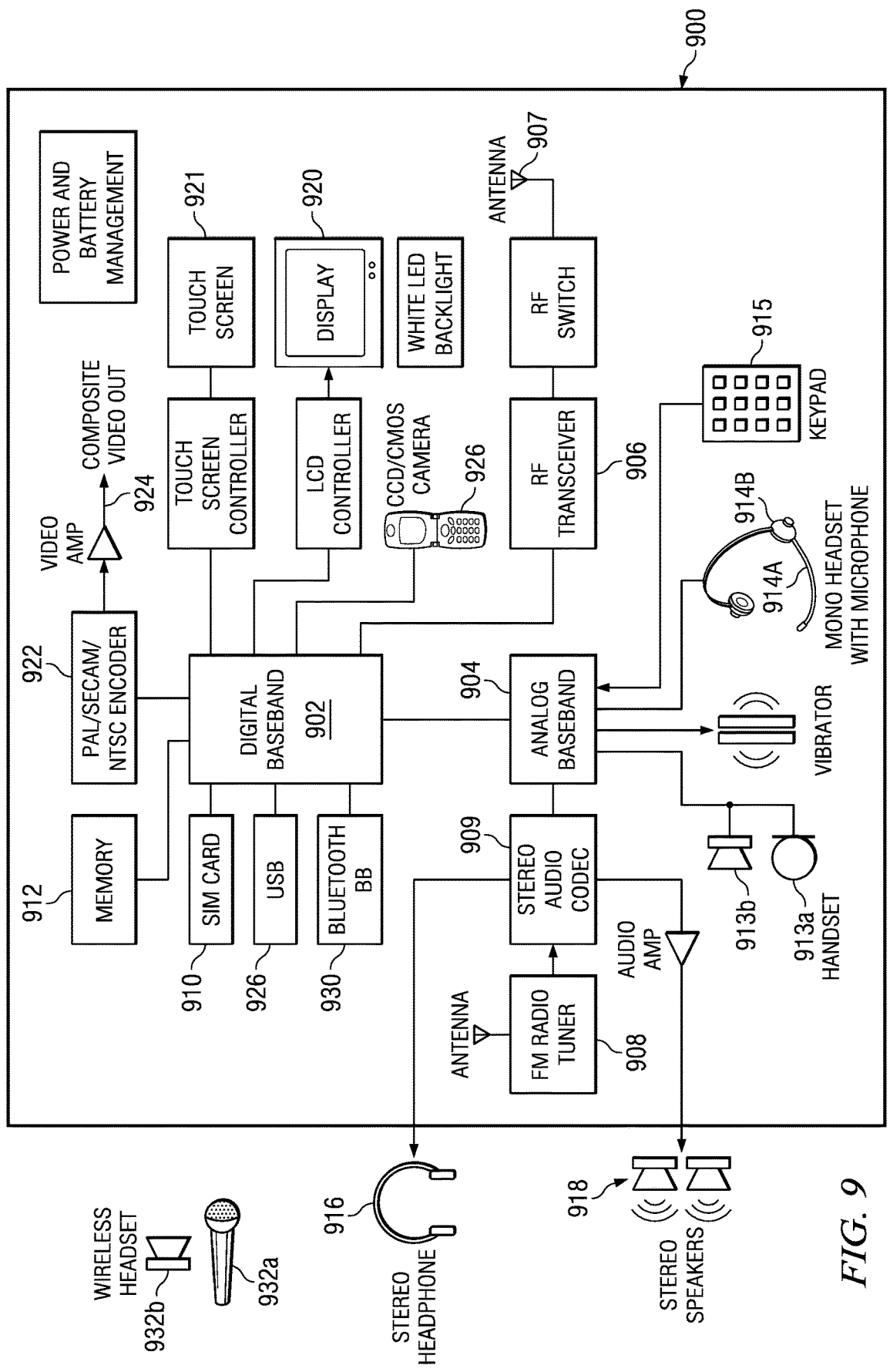
FIG. 9 is a block diagram of a cellular phone for use in the network of FIG. 1.

FIG. 9 is a block diagram of a UE 1000 that stores a fixed set of preamble parameter configurations for use across a complete range of cell sizes within the cellular network, as described above. Digital system 1000 is a representative cell phone that is used by a mobile user. Digital baseband (DBB) unit 1002 is a digital processing processor system that includes embedded memory and security features.

Analog baseband (ABB) unit 1004 performs processing on audio data received from stereo audio codec (coder/decoder) 1009. Audio codec 1009 receives an audio stream from FM Radio tuner 1008 and sends an audio stream to stereo headset 1016 and/or stereo speakers 1018. In other embodiments, there may be other sources of an audio stream, such a compact disc (CD) player, a solid state memory module, etc. ABB 1004 receives a voice data stream from handset microphone 1013*a* and sends a voice data stream to handset mono speaker 1013*b*. ABB 1004 also receives a voice data stream from microphone 1014*a* and sends a voice data stream to mono headset 1014*b*. Usually, ABB and DBB are separate ICs. In most embodiments, ABB does not embed a programmable processor core, but performs processing based on configuration of audio paths, filters, gains, etc being setup by software running on the DBB. In an alternate embodiment, ABB processing is performed on the same processor that performs DBB processing. In another embodiment, a separate DSP or other type of processor performs ABB processing.

RF transceiver 1006 includes a receiver for receiving a stream of coded data frames and commands from a cellular base station via antenna 1007 and a transmitter for transmitting a stream of coded data frames to the cellular base station via antenna 1007. A command received from the base station indicates what configuration number of the fixed set of preamble parameter configurations is to be used in a given cell, as described in more detail above.

A non-synchronous PRACH signal is transmitted using a selected preamble structure based on cell size when data is ready for transmission as described above; in response, scheduling commands are received from the serving base station. Among the scheduling commands can be a command (implicit or explicit) to use a particular sub-channel for transmission that has been selected by the serving NodeB. Transmission of the scheduled resource blocks are performed by the transceiver using the sub-channel designated by the serving NodeB. Frequency hopping may be implied by using two or more sub-channels as commanded by the serving NodeB. In this embodiment, a single transceiver supports OFDMA and SC-FDMA operation but other embodiments may use multiple transceivers for different transmission standards. Other embodiments may have transceivers for a later developed transmission standard with appropriate configuration. RF transceiver 1006 is connected to DBB 1002 which provides processing of the frames of encoded data being received and transmitted by cell phone 1000.

The basic SC-FDMA DSP radio can include DFT, subcarrier mapping, and IFFT (fast implementation of IDFT) to form a data stream for transmission and DFT, subcarrier de-mapping and IFFT to recover a data stream from a received signal, as described in more detail in FIGS. 6-7. DFT, IFFT and subcarrier mapping/de-mapping may be performed by instructions stored in memory 1012 and executed by DBB 1002 in response to signals received by transceiver 1006.

DBB unit 1002 may send or receive data to various devices connected to USB (universal serial bus) port 1026. DBB 1002 is connected to SIM (subscriber identity module) card 1010 and stores and retrieves information used for making calls via the cellular system. DBB 1002 is also connected to memory 1012 that augments the onboard memory and is used for various processing needs. DBB 1002 is connected to Bluetooth baseband unit 1030 for wireless connection to a microphone 1032*a* and headset 1032*b* for sending and receiving voice data.

DBB 1002 is also connected to display 1020 and sends information to it for interaction with a user of cell phone 1000 during a call process. Display 1020 may also display pictures received from the cellular network, from a local camera 1026, or from other sources such as USB 1026.

DBB 1002 may also send a video stream to display 1020 that is received from various sources such as the cellular network via RF transceiver 1006 or camera 1026. DBB 1002 may also send a video stream to an external video display unit via encoder 1022 over composite output terminal 1024. Encoder 1022 provides encoding according to PAL/SECAM/NTSC video standards.

As used herein, the terms "applied," "coupled," "connected," and "connection" mean electrically connected, including where additional elements may be in the electrical connection path. "Associated" means a controlling relationship, such as a memory resource that is controlled by an associated port. The terms assert, assertion, de-assert, de-assertion, negate and negation are used to avoid confusion when dealing with a mixture of active high and active low signals. Assert and assertion are used to indicate that a signal is rendered active, or logically true. De-assert, de-assertion, negate, and negation are used to indicate that a signal is rendered inactive, or logically false.

While the invention has been described with reference to illustrative embodiments, this description is not intended to be construed in a limiting sense. Various other embodiments of the invention will be apparent to persons skilled in the art upon reference to this description.

Embodiments of this invention apply to any flavor of frequency division multiplex based transmission. Thus, the concept of valid specification of sub-channels can easily be applied to: OFDMA, OFDM, DFT-spread OFDM, DFT-spread OFDMA, SC-OFDM, SC-OFDMA, MC-CDMA, and all other FDM-based transmission strategies.

A NodeB is generally a fixed station and may also be called a base transceiver system (BTS), an access point, or some other terminology. A UE, also commonly referred to as terminal or mobile station, may be fixed or mobile and may be a wireless device, a cellular phone, a personal digital assistant (PDA), a wireless modem card, and so on.

In a general embodiment of the present disclosure, the set of allowed PRACH preamble signals is defined by two other sets: 1) a set of allowed root CAZAC sequences, and 2) a set of allowed modifications to a given root CAZAC sequence. In one embodiment, PRACH preamble signal is constructed from a CAZAC sequence, such as a ZC sequence. Additional modifications to the selected CAZAC sequence can be performed using any of the following operations: multiplication by a complex constant, DFT, IDFT, FFT, IFFT, cyclic shifting, zero-padding, sequence block-repetition, sequence truncation, sequence cyclic-extension, and others. Thus, in various embodiments of the present disclosure, a UE constructs a PRACH preamble signal by selecting a CAZAC sequence, possibly applying a combination of the described modifications to the selected CAZAC sequence, modulating the modified sequence, and transmitting the resulting PRACH signal over the air.

In some embodiments, the fixed set of preamble parameters stores both the cyclic shift values and the number of root sequences, while in other embodiments the cyclic shift values are stored and the number of root sequences is computed from the cyclic shift values.

It is therefore contemplated that the appended claims will cover any such modifications of the embodiments as fall within the true scope and spirit of the invention.

What is claimed is:

1. A method for transmitting from user equipment (UE) to base stations (nodeB) in a cellular network, comprising:
   establishing a fixed set of preamble parameter configurations for use across a complete range of cell sizes within the cellular network, the fixed set of preamble parameter configurations including sixteen preamble parameter configurations, each of the preamble parameter configurations corresponding to a number of root sequences needed for determining 64 preamble signatures, wherein the number of root sequences needed for determining the 64 preamble signatures for at least two of the preamble parameter configurations in the fixed set is equal to two;
   receiving at a UE located in a cell a configuration number transmitted from a nodeB serving the cell, the configuration number indicative of a size of the cell;
   selecting a preamble parameter configuration specified by the received configuration number from the fixed set of preamble parameter configurations; and
   transmitting a preamble from the UE to the nodeB using the selected preamble parameter configuration indicated by the configuration number.

2. The method of claim 1, wherein each of the preamble parameter configurations of the fixed set of preamble parameter configurations implicitly defines the number of root sequences and a number of cyclic shifts per root sequence.

3. The method of claim 2, wherein the configuration number is received using four signaling bits.

4. The method of claim 2, wherein transmitting a preamble comprises:
   determining the number of root sequences and the number of cyclic shifts of the selected preamble parameter configuration;
   mapping a predetermined number of preamble signatures to subsequent cyclic shifts of a given root sequence according to the number of cyclic shifts until the given root sequence is full, for all of the number of root sequences until a last root sequence;
   adjusting the number of cyclic shifts mapped onto the last root sequence such that the predetermined number of preamble signatures are mapped; and
   selecting one of the mapped preamble signatures for use in transmitting the preamble.

5. The method of claim 4, wherein the predetermined number of preamble signatures is sixty-four.

6. The method of claim 1, wherein the fixed set of preamble parameter configurations sample the continuous cell size range covered by the network in a non-linear way, such that a finer configuration granularity is provided for smaller cells, whereby a broader deployment of smaller cells compared to larger cells is better supported.

7. A user equipment (UE) for use in a cellular network, comprising:
   means for storing a fixed set of preamble parameter configurations for use across a complete range of cell sizes within the cellular network, the fixed set of preamble parameter configurations including sixteen preamble parameter configurations, each of the preamble parameter configurations corresponding to a number of root sequences needed for determining 64 preamble signatures, wherein the number of root sequences needed for determining the 64 preamble signatures for at least two of the preamble parameter configurations in the fixed set is equal to two;
   means for receiving information by the UE within a given cell that designates a particular preamble parameter configuration from the fixed set of preamble parameter configurations;
   means for selecting a preamble parameter configuration specified by the received configuration number from the fixed set of preamble parameter configurations; and
   means for transmitting a preamble from the UE to the nodeB using the selected preamble parameter configuration indicated by the configuration number.

8. The UE of claim 7, wherein each of the preamble parameter configurations of the fixed set of preamble parameter configurations implicitly defines the number of root sequences and a number of cyclic shifts per root sequence.

9. The UE of claim 8, wherein the configuration number is received using four signaling bits.

10. The UE of claim 8, wherein the means for transmitting a preamble comprises:
    means for determining the number of root sequences and the number of cyclic shifts of the selected preamble parameter configuration;
    means for mapping a predetermined number of preamble signatures to subsequent cyclic shifts of a given root sequence according to the number of cyclic shifts until the given root sequence is full, for all of the number of root sequences until a last root sequence;
    means for adjusting the number of cyclic shifts mapped onto the last root sequence such that the predetermined number of preamble signatures are mapped; and
    means for selecting one of the mapped preamble signatures for use in transmitting the preamble.

11. A cellular telephone for use in a cellular network, comprising:
    a receiver connected to an antenna operable to receive information within a given cell that designates a particular configuration number of a fixed set of preamble parameter configurations for use across a complete range of cell sizes within the cellular network, the fixed set of preamble parameter configurations including sixteen preamble parameter configurations, each of the preamble parameter configurations corresponding to a number of root sequences needed for determining 64 preamble signatures, wherein the number of root sequences needed for determining the 64 preamble signatures for at least two of the preamble parameter configurations in the fixed set is equal to two;
    a processor connected to a storage memory holding instructions for execution by the processor and for holding the fixed set of preamble parameter configurations and connected to obtain signals from the receiver, wherein the processor is operable to select a preamble parameter configuration specified by the received configuration number from the fixed set of preamble parameter configurations; and
    a transmitter connected to the processor operable to transmit a signal from the cellular telephone to the NodeB using the selected preamble parameter configuration.

12. The cellular telephone of claim 11, wherein each of the preamble parameter configurations of the fixed set of preamble parameter configurations implicitly defines the number of root sequences and a number of cyclic shifts per root sequence.

13. The cellular telephone of claim 12, wherein the configuration number is received using four signaling bits.

14. The cellular telephone of claim 12, wherein the transmitter comprises:
    circuitry for determining the number of root sequences and the number of cyclic shifts of the selected preamble parameter configuration;
    circuitry for mapping a predetermined number of preamble signatures to subsequent cyclic shifts of a given root sequence according to the number of cyclic shifts until the given root sequence is full, for all of the number of root sequences until a last root sequence;
    circuitry for adjusting the number of cyclic shifts mapped onto the last root sequence such that the predetermined number of preamble signatures are mapped; and
    circuitry for selecting one of the mapped preamble signatures for use in transmitting the preamble.

15. A method for transmitting from user equipment (UE) to base stations (nodeB) in a cellular network, comprising:
    establishing a fixed set of preamble parameter configurations for use across a complete range of cell sizes within the cellular network, the fixed set of preamble parameter configurations including sixteen preamble parameter configurations, each of the preamble parameter configurations corresponding to a number of root sequences needed for determining 64 preamble signatures, wherein the number of root sequences needed for determining the 64 preamble signatures for at least two of the preamble parameter configurations in the fixed set is equal to two;
    determining a size of a cell being served by a nodeB;

transmitting to all UE located in the cell a configuration number from the nodeB serving the cell, the configuration number indicative of the size of the cell; and receiving a preamble transmitted from a UE located with the cell using a preamble parameter configuration selected from the fixed set of preamble parameter configurations specified by the configuration number.

16. The method of claim 15, wherein each of the preamble parameter configurations of the fixed set of preamble parameter configurations implicitly defines the number of root sequences and a number of cyclic shifts per root sequence.

17. The method of claim 16, wherein the configuration number is transmitted using four signaling bits.

18. The method of claim 15, wherein the fixed set of preamble parameter configurations sample the continuous cell size range covered by the network in a non-linear way, such that a finer configuration granularity is provided for smaller cells, whereby a broader deployment of smaller cells compared to larger cells is better supported.

* * * * *